UNITED STATES PATENT OFFICE 1,996,168

PROCESS OF PRODUCING SOLIDIFIED MINERAL OIL PREPARATION

Eduard Orno Ornfeldt, Genf, Switzerland, assignor to Kerasin A. G., Zug, Switzerland No Drawing. Application March 30, 1933, Serial No. 663,644. In Germany September 23, 1930

11 Claims. (Cl. 167—63)

The present invention relates to a process of converting mineral oils such as rock oil, brown coal oil, black coal oil and the like or fractions of such substances into solidified preparations, for instance preparations of jelly-like, unguentous or pulverulent consistency.

It is known per se to thicken oils of this kind by adding wax, paraffin and soaps. When these substances are used, however, relatively high percentages are required in order to obtain unguentous products.

As a result of extensive investigations I have now found, that, when certain definite working conditions are strictly kept, substances of the above named kind may be solidified by adding relatively small amounts of solid substances. The products obtained are of excellent consistency and may with advantage be used for a great variety of technical purposes.

It is of essential importance that the added matter contains small amounts of bees wax or synthetic wax of the same nature. Part of the bees wax may for instance be substituted by desired amount of paraffin, ceresin and the like, but at least 1% of a wax of the said kind must be present. It is also necessary to use small amounts of soap, particularly soda soap.

Instead of natural, yellow or white bees wax also the constituents of natural or artificial bees wax may be used. By the term "bees wax" as used in the claims I intend to include all such forms and/or constituents.

The soap component employed according to the present invention is suitably used in combination with organic solvents, for instance alcohol.

The invention may for example be carried out in the following manner: A wax of the said kind is melted by heating to about 60° C. and soap, for example anhydrous soap powder, sapo medicatus or the like, is mixed with small amounts of alcohol, insufficient to dissolve the soap, by heating to temperatures of approximately 60–65° C. The mineral oil and the mixture of soap and alcohol are thereupon poured into the melted bees wax with stirring. The additional substances are preferably introduced simultaneously with the mineral oil.

It is also possible to introduce the bees wax into the mineral oil separately and to add the alcoholic soap mixture subsequently. However, when this form of treatment is carried out a prolonged and more intensive stirring may be required.

The process is suitably carried out at raised temperatures, for instance at about 30° C.

In accordance with a further modification of the invention wax or a mixture of wax or paraffin and the like is added to the oil whereupon the mixture is heated for some time to a relatively high temperature, for instance 100° C., and the other constituents are added to the mass under continuous stirring during the subsequent cooling.

The apparatus in which the treatment is carried out may for instance consist of a heatable boiler in which a stirring device is arranged. The stirring is continued until the desired degree of solidification has been reached and the mass is thereupon allowed to cool. The cooled product may advantageously for some days be exposed to the air in the form of relatively thin layers and may hereby if desired be stirred from time to time. Through this treatment the consistency and the smell of the products are improved.

It is of essential importance that the process is conducted in such a manner, that a consistent non-decomposing mass is obtained as end product. This must be taken into consideration when choosing the added substances, the proportions of ingredients and the manner in which the constituents are to be brought together. Not only is the nature of the added substances important, but also the relative amounts of the added substances used and the proportions between the added substances and the mineral oil. In accordance with the amount of solid constituents added more or less consistent products, in the form of gels or unguents, are obtained.

I have also found, that it is advantageous to introduce the alcoholic soap mixture simultaneously with the solid additional substances or after the introduction of the latter. The soap solution should therefore preferably not be added before the bees wax has been introduced into the mineral oil.

Example

To a melt of 50 g. of bees wax 1000 g. of petroleum and a mixture of 30 g. of sapo medicatus and 50 g. of common methylated spirits, heated to a temperature of about 65° C., are added. Both additions are hereby suitably added to the melt simultaneously under vigorous stirring or in the form of separate jets. When the constituents have been thoroughly mixed, which depending upon the prevailing conditions will require a time of 5 to 10 minutes or more, the mixture is allowed to cool. The product obtained has the consistency of American petroleum jelly. Fractions of brown coal tar can be solidified in the same manner.

The unguentous or jelly-like product may also be converted into pulverulent bodies by adding suitable solid substances such as for instance magnesium carbonate or talcum or a plurality of such substances.

During or after the production of the novel preparations additional constituents may be added, for instance substances adapted to improve the smell of the products or substances which exert a cosmetic or therapeutic effect. The smell may for instance be improved by adding eucalyptus oil, lemon oil, rosemary oil, thyme oil, mirbane oil or camomile oil or a plurality of these substances. Also formaldehyde, paraformaldehyde and a great variety of other substances or bodies may be added to the products.

The novel process may be used for converting mineral oils of any kind into jelly-like or unguentous products or products of another consistency, which consist almost exclusively of mineral oil. Highly concentrated petroleum preparations may be reproduced in a very simple and inexpensive manner and in a form in which they may conveniently be used, for instance as an unguent or the like.

The purity of the products is dependent upon the degree of purity of the starting materials. Several valuable products may be produced by treating pure petroleum with bees wax and a mixture of medical soap and alcohol, for instance products which are equivalent to American petroleum jelly and which may be used for all purposes for which hitherto petroleum jelly has been employed. Moreover, petroleum may be converted into the form of a gel and this preparation or the corresponding unguentous preparation may be used for a wide variety of different purposes, for instance for the treatment of chilblains, for surgical treatment, for destroying lice, mosquitos and other insects and parasites, for promoting the growth of the hair and for several other related purposes. As already mentioned substances of different kinds adapted to exert a special effect may be added to the preparations during or after the production of the latter. Powdery preparations produced after the novel process may be used for cosmetic, therapeutic and other purposes. By treating crude oils technical products of high quality may be obtained, for instance lubricating fats and the like. If required or desired the properties of the products obtained may of course also be improved by subjecting same to purification processes.

It can be understood, therefore, from the prior description and disclosure of my invention, that it relates broadly to the production of unguentous homogeneous, uniformly melting and uniformly resolidifying greases or petroleum jellies from relatively liquid mineral oils by the addition to such oils of relatively small portions of solidifying agents, that is, soap and bees wax. In this general connection, when reference is made in the specification and claims to solidifying agents, I refer to these agents consisting of bees wax or its constituents and soap which cooperate together to coalesce the oil to form a homogeneous, unguentous, uniformly melting and uniformly resolidifying mass. If desired, in addition to the solidifying agents, portions of paraffin may also be added, but it is essential that at least 1% of bees wax be present which is caused to be dispersed and to cooperate with the soap to act in coalescing the oil. The bees wax may be either natural bees wax or its constituents or artificial bees wax, it being only essential that its active constituents be present.

Having thus described my invention with reference to specific examples drawn to preferred embodiments, which are to be considered as illustrative and not as limiting, since the invention is to be limited only by the prior art, what I claim is:

1. A process of producing a solidified oil product, comprising introducing solidifying agents comprising not more than about 5% bees wax into mineral oil while stirring, heating the mass, and diffusing said bees wax with a mixture of soap and an organic solvent while continuously stirring, whereby said oil is converted into an unguentous, homogeneous, uniformly melting and uniformly resolidifying product, the amounts of solidifying agents not exceeding about 10% of said mineral oil.

2. A process of producing a homogeneous, unguentous, uniformly melting and uniformly resolidifying grease from a mineral oil, comprising diffusing solidifying agents comprising not less than 1% or more than about 5% of bees wax in oil in the presence of a small amount of soap while agitating the mass to coalesce the same and heating, the amounts of said solidifying agents not exceeding about 10% of said mineral oil.

3. A process of producing a homogeneous, unguentous, uniformly melting and uniformly resolidifying grease from a mineral oil, comprising adding heat to said oil and with agitation coalescing the same with a solidification agent consisting of a small amount of soap and a small amount of bees wax not exceeding about 5% in substantially equivalent proportions.

4. A process of producing a homogeneous, unguentous, uniformly melting and uniformly resolidifying grease from a mineral oil, comprising adding heat to said oil and with agitation coalescing the same with solidifying agents comprising a small amount of soap suspended in an organic solvent, and not exceeding about 5% bees wax, agitating the mass, the amounts of solidifying agents added not exceeding about 10% of said mineral oil.

5. A process of producing a homogeneous, unguentous, uniformly melting and uniformly resolidifying grease from a mineral oil, comprising adding a small amount of soap to a mixture of not less than 1% or more than about 5% melted bees wax and said oil and intimately combining said components with agitation and heat.

6. A process of producing a powdered solidified oil product, comprising adding heat and diffusing in a mineral oil at raised temperatures solidifying agents comprising not exceeding about 5% bees wax in the presence of a small amount of soap, the amounts of said solidifying agents not exceeding about 10%, agitating the resultant mass, allowing the mass to cool and adding a pulverulent solid substance to said resultant coalesced homogeneous mass thereby converting said mass into a powdery solid preparation.

7. A homogeneous, unguentous, uniformly melting and uniformly resolidifying grease comprising a mineral oil containing solidifying agents comprising not less than 1% or more than about 5% bees wax, and soap, said soap cooperating with said bees wax to maintain said bees wax uniformly diffused within the resulting oil mass, the amounts of said solidifying agents not exceeding about 10% of said oil.

8. The process for producing a therapeutic solidified homogeneous mineral oil product having uniformly melting and uniformly resolidifying characteristics comprising diffusing solidifying agents comprising not more than about 5% bees wax in a mineral oil with soap and with added heat, while stirring, the total amounts of solidifying agents not exceeding about 10% of the mineral oil and adding a therapeutic agent whereby upon cooling a solidified, homogeneous therapeutic unguent is obtained from mineral oil.

9. A powdery, solidified mineral oil product containing a homogeneous, unguentous, uniformly melting and uniformly resolidifying grease containing not less than 1% or more than about 5% bees wax, and soap, said soap cooperating with said bees wax to maintain said bees wax uniformly diffused within the resulting mass, combined with a pulverulent solid.

10. A process of producing a homogeneous, unguentous, uniformly melting and uniformly resolidifying grease from a mineral oil, comprising adding a small amount of soap suspended in organic solvent to a heated mixture of not less than 1% or more than about 5% melted bees wax, paraffin and said oil and intimately combining said components with agitation, the solidifying agents being present in amounts not exceeding about 10% of the oil.

11. A homogeneous, unguentous, uniformly melting and uniformly resolidifying grease comprising a mineral oil containing paraffin and solidifying agents comprising not less than 1% or more than about 5% bees wax, and soap, said soap cooperating with said bees wax to maintain said bees wax uniformly diffused within the resulting oil mass, the amounts of said solidifying agents not exceeding about 10% of said oil.

EDUARD ORNO ORNFELDT.